Oct. 12, 1937.                O. WITTEL                2,095,848

FILM DRIVING APPARATUS

Filed July 6, 1935

INVENTOR:
Otto Wittel,
BY Newton M. Perrins
Rolla A. Carter
ATTORNEYS.

UNITED STATES PATENT OFFICE 2,095,848

FILM DRIVING APPARATUS

Otto Wittel, Rochester, N. Y., assignor, by mesne assignments, to Eastman Kodak Company, Jersey City, N. J., a corporation of New Jersey Application July 6, 1935, Serial No. 30,202

7 Claims. (Cl. 271—2.3)

My invention relates to film handling apparatus in which the film is advanced serially past two stations, at one of which stations the film is advanced intermittently and is advanced continuously at the other station. The apparatus of my invention is peculiarly adapted for use in sound motion picture apparatus in which the film is advanced intermittently past the picture projecting gate and is advanced continuously past the sound reproducing gate. For moving the film it is usually provided with sprocket tooth perforations along one or both of its edges which are adapted to engage with the teeth of suitable sprocket wheels over which it is trained in passing from the supply to the take-up reels.

In order to advance the film with as uniform a motion as possible past the sound reproducing station, it is generally desirable to employ a belt-type drive, that is, one in which a smooth surfaced wheel or drum engages the film rather than a sprocket wheel. However, when a sprocket wheel is employed for advancing the film to the picture loop, some precautionary measures are necessary to make certain that the same total length of film is advanced by the sprocket wheel as is advanced by the drum, since otherwise, due to film shrinkage or slight differences in the pitch of the sprocket wheel or in the diameter of the drum, one of the drives will invariably advance the film at a greater rate than will the other. This difference in drive will result in either increasing or decreasing the length of film in the picture loop with the obvious disadvantages, and in addition, will destroy synchronism between the sound being reproduced and the picture being projected, inasmuch as it is standard practice to have a picture and its corresponding sound spaced a definite distance along the length of the film.

Figure 1:
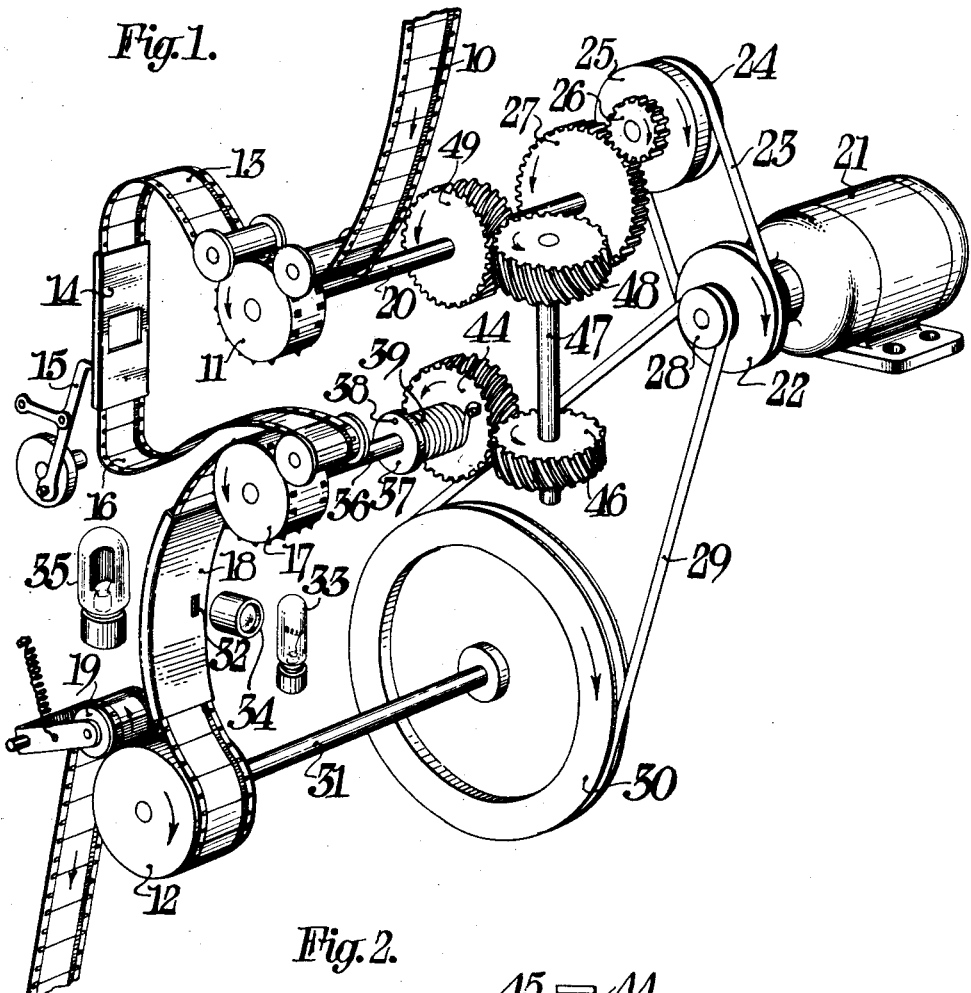
Figure 2:
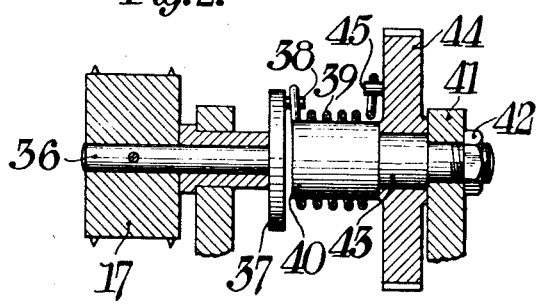

It is an object of my invention to provide an improved film driving apparatus in which the film is driven jointly by a sprocket and a drum and in which the sprocket is tended to be over-driven but limited in film advancing speed to the film advancing speed of the drum. Another object of my invention is the provision of means controlled by the number of perforations passing the sound gate to regulate the tendency drive connection to the sprocket wheel whereby it will advance into the picture loop a length of film having the same number of sprocket perforations. In the form illustrated, my invention comprises a film driven sprocket, a sprocket hole counter engaging the film at a point where it is driven by the drum and a braking means for the driving sprocket whose braking action is actuated whenever the speed of the sprocket exceeds the speed of the sprocket hole counter. Other objects and advantages of my invention will be apparent when read in connection with the accompanying drawing, Fig. 1 of which is a diagrammatic representation in perspective of a preferred embodiment of my invention, and Fig. 2 is a view in section of a free running braking connection.

In the apparatus illustrated a film 10 is shown driven jointly by a sprocket 11 and a belt-type drive or drum 12 which elements the film 10 engages serially in its passage through the apparatus. While the invention is applicable equally to a sound picture recording apparatus and a sound picture reproducing apparatus, I have chosen to illustrate it as applied to a reproducer. The film 10 is advanced by the sprocket 11 into a free loop 13 from which it is drawn through a picture projecting guide 14 by suitable intermittent mechanism 15. The film 10 leaving the picture guide 14 enters a free loop 16 from which it is drawn over a free running sprocket 17 and a sound gate 18 by the drum 12 around which the film is looped, an idler 19 being provided for holding the film 10 looped around the drum 12 in a well known manner. It will be understood that suitable reels, not shown, are provided from which and to which the film 10 is wound. It will also be understood that other portions of the complete apparatus which form no part of my invention and which are unnecessary to the complete understanding thereof have been omitted since their inclusion in the drawing would obscure, rather than make clear, the invention.

The sprocket 11 is mounted on a shaft 20 and is adapted to be driven by a suitable motor 21 through a connection comprising a pulley 22 mounted on the motor shaft and connected by a belt 23 to a driven member 24 which in cooperation with a plate 25 forms a friction clutch. The plate 25 carries a gear 26 which meshes with a gear 27 mounted on the sprocket shaft 20. With this arrangement it will be seen that there is provided a yielding or slipping connection between the motor 21 and the sprocket 11. This slipping connection may be provided in any suitable manner or by any well known mechanism, such as permitting the belt 23 to slip on its pulleys or by making the clutch of any type which will transmit sufficient torque to drive the sprocket 11 but which is capable of being slipped so that the member 24 may be driven at a greater speed than the member 25.

The drum 12 is also adapted to be driven by the motor 21 by any suitable connection such as a pulley 28 mounted on the motor shaft and connected by a belt 29 to a pulley 30 mounted on the shaft 31 which carries the drum 12. From the above description it will be seen that there is an elastic drive connection between the motor 21 and the sprocket 11 and a direct speed ratio drive between the motor and the drum 12.

The film 10, as above described, is pulled by the drum 12 over the sound gate 18 which is provided with a suitable aperture 32 at which the sound is taken off in any well known manner as by means of a lamp 33 and optical system 34 for illuminating the sound record and a light-sensitive cell 35 for receiving the light beam as modulated by the sound record. The free running sprocket 17 which engages the film at a point where it is moved by the drum 12 is driven by the film and constitutes a perforation counter. This sprocket 17 is shown as being of the same size as sprocket 11 and in order to cause the same length of film to be advanced by the drum 12 and the sprocket 11, the sprocket 17 is employed to limit the speed of the sprocket 11 in the following manner. The sprocket 17 is secured to a shaft 36 which carries at its other end a disc 37 provided with a pin 38 to which is secured one end of a coil spring 39. As best shown in Fig. 2, the coil spring 39 surrounds a stationary shaft 40 which is rigidly secured to a portion 41 of the frame of the apparatus by means of a nut 42. A section 43 of the shaft 40 is provided with a reduced diameter and serves as a bearing for a gear 44 which is provided with a pin 45 to which the other end of the coil spring 39 is anchored. The gear 44 meshes with a gear 46 carried by a shaft 47 to which is secured a second gear 48 which meshes with a gear 49 carried by the shaft 20 of the sprocket 11 so that the gear 44 is rotated at the same angular speed as the sprocket 11. The arrangement just described constitutes an irreversible rotating connection in that the gear 44 rotates in a direction tending to coil the spring 35 and thereby cause it to grip the shaft 40 to bring about a braking action on the gear 44.

The disc 37 which rotates with the sprocket hole counter 17 tends to uncoil the spring 39 and release its braking action so that whenever the disc 37 and the gear 44 are rotating at the same angular speed the spring 39 and shaft 40 constitute a free running connection. However, whenever the gear 44 starts to rotate faster than the disc 37, the spring 39 grips the shaft 40 to institute a braking action and the gear 44 is caused to slow down until the braking action ceases or nearly ceases. This slowing down of the gear 44 and also of the sprocket 11 is permitted by the slipping drive above described between the motor 21 and the sprocket 11.

With the apparatus above described the motor 21, through a slipping drive tends to drive the sprocket 11 at a greater velocity than it drives the drum 12, and due to the braking action applied by the spring 39, the tendency driving torque is overcome to the extent necessary for preventing an over-drive of the sprocket 11.

For the purpose of illustration I have shown a particular type of sound head but it will be understood that my invention is applicable equally to any well known sound head in which a drum is used for advancing the film through a scanning beam.

While I have shown a specific type of braking means between the sprocket hole counter and the film driving sprocket, it will be understood that my invention is not limited thereto since any suitable means may be employed for performing this function. Other arrangements and modifications will be apparent to those skilled in the art without departing from the spirit of the invention, the scope of which is covered by the appended claims.

What I claim as new and desire to secure by Letters Patent of the United States is:

1. Film driving apparatus for advancing two portions of a film at the same linear speed comprising a sprocket and a drum arranged to engage the film serially with a free loop of film therebetween, a motor for driving the sprocket and the drum, a connection between the motor and the sprocket tending to drive the sprocket at a speed to advance the film faster than it is advanced by the drum, a second sprocket adapted to be rotated by the film as it approaches the drum, a stationary shaft, a coiled spring surrounding the shaft, one end of said spring being connected to the motor driven sprocket so that rotation of this sprocket coils the spring thereby causing it to grip the stationary shaft, and the other end of said spring being connected to said second sprocket so that rotation thereof uncoils the spring, whereby the film driving sprocket will be rotated at a speed corresponding to the speed of the film driven sprocket.

2. Film driving apparatus comprising a sprocket and a drum arranged to engage the film serially, a motor for driving the sprocket and the drum, a slipping connection between the motor and the sprocket capable of transmitting enough torque to drive the sprocket, a second sprocket arranged to be engaged and rotated by the film as it approaches the drum, and connecting means between said second sprocket and the motor driven sprocket for overloading said connection to cause it to slip whenever the motor driven sprocket tends to drive said second sprocket.

3. Film driving apparatus comprising a film feeding sprocket, a driven clutch for continuously driving said sprocket, a driven drum for advancing the film at a uniform velocity, a sprocket adapted to be engaged and driven by the film as it approaches the drum, and an irreversible driving connection between said film driven sprocket and said clutch driven sprocket for limiting the speed of the latter to the speed of the former.

4. Film driving apparatus comprising a drum arranged to engage and advance a film, a motor for driving the drum, a sprocket hole counter arranged to engage the film being advanced by the drum, a sprocket for advancing another portion of the film, a driving connection including a clutch between the motor and the sprocket adapted to drive the sprocket at a speed greater than the speed at which the film drives the sprocket hole counter, braking means for limiting the speed of the sprocket, and means responsive to any increase in the speed of the sprocket relative to the speed of said counter for actuating said braking means.

5. Apparatus for driving a film provided with sprocket tooth openings comprising a sprocket and a drum arranged to engage the film serially, a motor having driving connections with the sprocket and the drum, a sprocket adapted to be rotated by the film at a point where the film is moved by the drum, a slipping drive in the connection between the motor and the sprocket, and a coupling between said sprockets for preventing rotation of the sprocket connected to the slipping drive at a speed greater than the speed at which the film driven sprocket is rotated, said coupling including means controlled by the film driven sprocket for retarding the motor driven sprocket.

6. Film driving apparatus comprising a sprocket and a drum arranged to engage a film serially, means for driving the sprocket and drum, a sprocket hole counter arranged to engage the film where it is moved by the drum, an irreversible driving connection between the sprocket and the sprocket hole counter whereby the sprocket cannot rotate at a speed greater than the speed of the sprocket hole counter, and a friction clutch between the driving means and the sprocket.

7. Film driving apparatus comprising a film advancing drum and a film advancing sprocket, a motor for driving the drum, a driven clutch for continuously driving the sprocket, one member of the clutch being driven by the motor at a velocity greater than it drives the drum, and means for applying a braking torque to the other member of the clutch when the sprocket is advancing the film at a greater velocity than it is advanced by the drum.

OTTO WITTEL.